April 28, 1931. A. H. C. TREPTE 1,803,153
SUPPORTING DEVICE FOR GARDEN HOSE
Filed Oct. 14, 1929
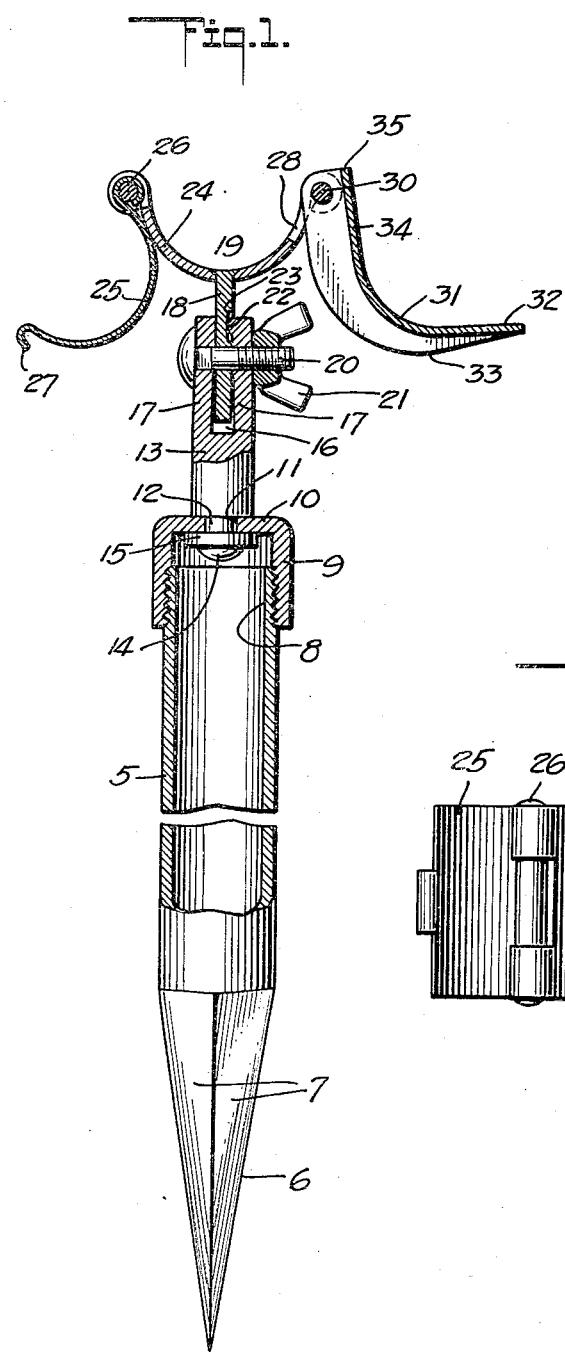
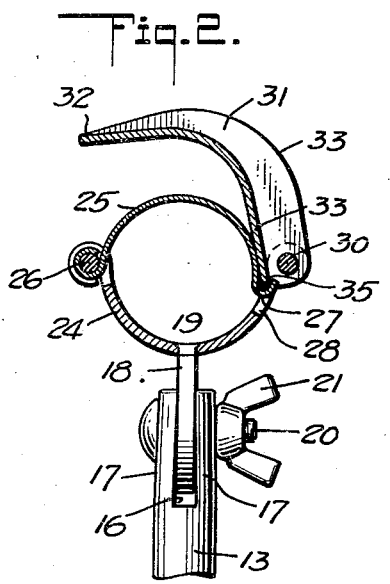
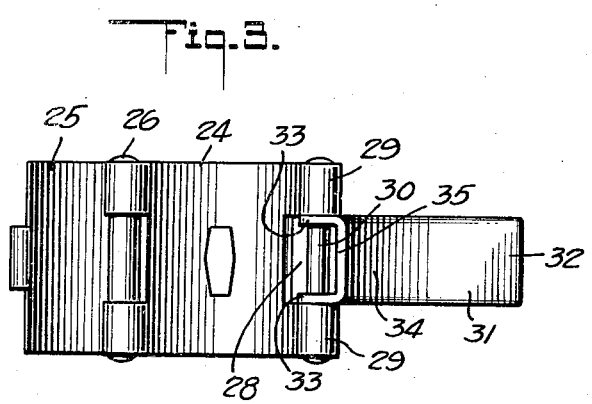
INVENTOR
ALFRED H. C. TREPTE
BY
ATTORNEYS Patented Apr. 28, 1931

1,803,153

UNITED STATES PATENT OFFICE

ALFRED H. C. TREPTE, OF LOS ANGELES, CALIFORNIA

SUPPORTING DEVICE FOR GARDEN HOSE

Application filed October 14, 1929. Serial No. 399,568.

My invention relates to supporting devices for garden hose and has for its primary object the provision of a readily portable device of this character which can be quickly attached to the soil and which will serve to accommodate a hose in a manner whereby its discharge or spray nozzle can be maintained in a selected position of angular adjustment and a spray or stream of water selectively directed to an intended portion of a lawn.

A further object of the invention is to provide a device of this character embodying a novel form of hose clamp which positively functions to secure a hose against slipping under the action of the pressure of water.

A further object of the invention is to provide a hose clamp which is simple of construction and positive of action.

Another object of the invention is to provide a device of this character which, when applied to a hose, need not be separated therefrom during the act of changing the position of the hose upon a lawn.

A still further object of the invention is to provide a clamp which will firmly engage the hose and yet not inflict injury thereto or in any way retard the flow of the water.

Another object of the invention is to provide a device of this character whose clamp is adjustable to accommodate garden hose of relatively different external diameters.

In the drawings,

Figure 1 is a view in vertical section of the complete device, showing the jaws of the clamp opened;

Figure 2 is a similar view, showing the jaws of the clamp closed; and

Figure 3 is a plan view of the clamp with the jaws opened.

In carrying the invention into practice, use is made of a simple form of portable stake 5. This may be a tubular metallic object such as a length of pipe formed at its lower end with a point 6 whereby it may be driven a suitable depth into the soil. The point 6 is also preferably formed with flat faces 7 which function suitably to hold the stake against turning in the soil.

The upper end of the stake 5 is threaded at 8 to accommodate a correspondingly internally threaded cap 9, and the latter has a head 10 formed with an aperture 11 at its central portion. This is in order that the reduced lower end 12 of a freely rotatable post 13 may find swiveled connection to permit the post to turn on a vertical axis. The reduced end 12 of the post is upset at 14 against a washer 15, the latter located within the cap 9 at a point directly under the head 10. The upper end of the post 13 is bifurcated at 16 to provide spaced apart branches 17 in the space between which is accommodated for turning movement the depending lug 18 of a clamp structure 19. A bolt 20 joins the lug 18 to the bifurcated portion of the post so that the clamp can be turned around a horizontal axis. The angular adjustment of the clamp can be retained by a winged nut 21 threadedly connected with the bolt 20 and adapted to bear against one of the branches 17 of the post. The said one branch of the post is preferably formed on its inner face with a rib 22 adapted to be presented in any one of a plurality of radial grooves 23 formed in one face of the lug 18.

The clamp 19 comprises a relatively rigid arcuate jaw 24 which rises from the lug 18 and a movable jaw 25 which I preferably form of lighter material than the jaw 24, so that it is rendered springy. The jaw 25 can be formed of brass, steel, or any other suitable well-known metal or desired material. The jaw 25 is hinged at 26 to one side of the jaw 24, and the free edge of said jaw 25 is provided with a relatively narrow hook or lug 27 adapted to pass through an opening 28 formed in the jaw 24 at a point between loops 29 which are formed thereon for the accommodation of a horizontal pintle 30, the latter passing through one end of an adjusting lever 31. The adjusting lever is formed with a manipulating extension 32 which occupies a position sufficiently spaced above the jaw 25 when the latter is fully closed or clamped about a hose. This is to enable the fingers of the operator to be inserted under the lever when adjusting the same with respect to the hose.

The lever 31 is in a sense peculiarly formed, being of a channeled construction so as to provide spaced apart side walls 33, 33, which are joined by a connecting wall 34. The walls 33, 33, are spaced apart to the extent that they straddle the hook 27 and so that the edge 35 of the lever will be presented directly against the hook 27 during the act of closing the jaw 25.

The stake 5 can be driven into a desired portion of the soil so that it will assume a substantially vertical position. The two jaws of the clamp are then laid open so as to permit the hose at a point near its spray nozzle to be associated therewith. The relatively springy jaw 25 is then adjusted over the hose where it rests lightly thereon, but in a manner that will dispose its hook 27 immediately in the path of the edge 35 of the lever 31. The lever is then turned, and due to the springiness of the jaw 25 the latter is given a slight helicoidal turn within the fixed jaw, in order that it may be made to fully co-act with the fixed jaw of the clamp to establish firm clamping action against the hose. The nozzle of the hose is now slightly extended to one side of the clamp, and it may be inclined to suit the user's taste and requirements, and can be held in such position by simply turning the nut 21 into adjusting engagement with the co-acting branch 17 of the swiveled post 13. The form of the entire device is such that the user can quickly withdraw the stake from one position in the soil and transplant it to another as required. This can be satisfactorily done without necessitating the removal of the hose from the clamp of the structure.

I claim as my invention:

A device of the class described comprising a portable stake, a tilting hose clamp carried by the stake at one end thereof, the said clamp comprising a pair of jaws one of which is mounted to swing on the other, the swinging jaw having a hook, the other jaw having an opening to receive the hook, and a manipulating lever carried by the other jaw and having a portion adjacent to the said opening adapted to co-act with the hook so that when the lever is turned in one direction a movement will be imparted to the swinging jaw, to thus spring both jaws into compressing relationship to the walls of an embraced hose.

ALFRED H. C. TREPTE.